United States Patent
Kang et al.

(10) Patent No.: US 12,534,643 B2
(45) Date of Patent: Jan. 27, 2026

(54) METHOD OF MANUFACTURING ULTRA-THIN ANTIREFLECTION STICKER AND ULTRA-THIN ANTIREFLECTION STICKER

(71) Applicant: THE INDUSTRY & ACADEMIC COOPERPATION IN CHUNGNAM NATIONAL UNIVERSITY (IAC), Daejeon (KR)

(72) Inventors: Seong Min Kang, Gwangmyeong-si (KR); Ji Seong Choi, Daejeon (KR)

(73) Assignee: THE INDUSTRY & ACADEMIC COOPERPATION IN CHUNGNAM NATIONAL UNIVERSITY (IAC), Daejeon (KR)

( * ) Notice: Subject to any disclaimer, the term of this patent is extended or adjusted under 35 U.S.C. 154(b) by 204 days.

(21) Appl. No.: 18/208,301

(22) Filed: Jun. 11, 2023

(65) Prior Publication Data
US 2023/0399546 A1    Dec. 14, 2023

(30) Foreign Application Priority Data
Jun. 13, 2022   (KR) .................. 10-2022-0071754

(51) Int. Cl.
C09J 7/25     (2018.01)
G09F 3/08     (2006.01)

(52) U.S. Cl.
CPC ............. *C09J 7/255* (2018.01); *G09F 3/08* (2013.01)

(58) Field of Classification Search
CPC ................... C09J 7/255; G09F 3/08
See application file for complete search history.

(56) References Cited

U.S. PATENT DOCUMENTS

2004/0029030 A1*   2/2004   Murray ............... B41M 7/0045
                                             156/243
2018/0145625 A1*   5/2018   Lyons ................. C09D 5/1681

FOREIGN PATENT DOCUMENTS

KR    10-2014-0117038 A    10/2014
KR    10-2293742 B1        8/2021

OTHER PUBLICATIONS

Tahir, Nanofabrication Techniques: Challenges and Future Prospects, Journal of Nanoscience and Nanotechnology, vol. 21, No. 10, Oct. 2021, pp. 4981-5013(33) (Year: 2021).*

* cited by examiner

*Primary Examiner* — JaMel M Nelson
*Assistant Examiner* — Erica Hartsell Funk
(74) *Attorney, Agent, or Firm* — Revolution IP, PLLC

(57) ABSTRACT

A method of manufacturing a monolayer-structured ultra-thin antireflection sticker through a soft lithography process and an ultra-thin antireflection sticker, includes: a master mold manufacturing step in which a master mold having a plurality of semi-spherical mold structures on an upper surface thereof is manufactured; a sticker material coating step in which a sticker material is coated onto the upper surface of the master mold; a cured film covering step in which a cured film is disposed to cover an upper surface of the sticker material; a curing step in which the sticker material is cured; a cured film removal step in which the cured film is removed from the sticker material; and a sticker peeling step in which the cured sticker material is peeled off the master mold, the peeled-off sticker material forming a monolayer-structured ultra-thin antireflection sticker having a plurality of antireflective structures on an upper surface thereof.

5 Claims, 15 Drawing Sheets

(b)

(a)

(c)

(a)

(b)

METHOD OF MANUFACTURING ULTRA-THIN ANTIREFLECTION STICKER AND ULTRA-THIN ANTIREFLECTION STICKER

FIELD

Embodiments of the present invention relate to an ultra-thin antireflection sticker manufacturing method and an ultra-thin antireflection sticker, and more particularly to a method of manufacturing a monolayer-structured ultra-thin antireflection sticker through a soft lithography process and an ultra-thin antireflection sticker.

BACKGROUND

A sticker type antireflection film is used for improvement in efficiency of a perovskite solar cell (PSC) through improvement in light transmittance efficiency (LTE).

Here, perovskite solar cells (PSCs) have attracted worldwide attention as a promising future energy source due to excellent characteristics thereof, such as high photoelectric conversion efficiency (PCE) and ease of manufacture.

When a sticker type antireflection film is attached to a perovskite solar cell, the perovskite solar cell can achieve excellent photovoltaic efficiency without damage thereto. Here, photovoltaic efficiency of a certain device can be defined as the quantity of external light transmitted to the device.

Since external sunlight can be efficiently transmitted to the perovskite solar cell, external quantum efficiency of the perovskite solar cell increases over the entire range of wavelengths, meaning increase in short circuit current density (Jsc). Accordingly, application of a good sticker type antireflection film to the perovskite solar cell is the most effective and easiest approach to increasing photoelectric conversion efficiency of solar devices.

As such, since the sticker type antireflection film has high photoelectric conversion efficiency and can be easily applied to a transparent substrate, the sticker type antireflection film has been continuously developed together with commercialization of the perovskite solar cell.

A low refractive index material is advantageous for effective manufacture of the sticker type antireflection film. Accordingly, it is possible to maximize an antireflection effect through manufacture of the sticker type antireflection film using the low refractive index material.

In general, an antireflection film is formed of polydimethylsiloxane (PDMS) having a refractive index of 1.43 and employs a structural optical effect through surface patterning for application to the perovskite solar cell.

However, a typical antireflection film formed of polydimethylsiloxane has a bilayer structure, which has a minimal manufacturing thickness of 200 μm due to process constraints, thereby making it difficult to apply the antireflection film to a high efficiency flexible device.

RELATED LITERATURE

Patent Document (Patent Document 1) Korean Patent Registration No. 10-2293742 (Title of the invention: Protective film for solar cells and method of manufacturing the same, Issue Date: Aug. 26, 2021)

SUMMARY

Embodiments of the present invention are conceived to solve such problems in the art and it is an object of the present invention to provide a method of manufacturing a monolayer-structured ultra-thin antireflection sticker through a soft lithography process and an ultra-thin antireflection sticker.

It will be understood that the present invention is not limited to the above object and the above and other objects of the present invention will become apparent to those skilled in the art from the detailed description of the following embodiments in conjunction with the accompanying drawings.

In accordance with one aspect of the present invention, a method of manufacturing an ultra-thin antireflection sticker includes: a master mold manufacturing step in which a master mold having a plurality of semi-spherical mold structures on an upper surface thereof is manufactured; a sticker material coating step in which a sticker material is coated onto the upper surface of the master mold; a cured film covering step in which a cured film is disposed to cover an upper surface of the sticker material; a curing step in which the sticker material is cured; a cured film removal step in which the cured film is removed from the sticker material; and a sticker peeling step in which the cured sticker material is peeled off the master mold, the peeled-off sticker material forming a monolayer-structured ultra-thin antireflection sticker having a plurality of antireflective structures on an upper surface thereof.

Here, in the sticker material coating step, the sticker material may be formed of perfluorinated polyether (PFPE).

In the cured film covering step, the cured film may be formed of a polyethylene terephthalate (PET) material.

The cured film covering step may include: a covering step in which the cured film is disposed to cover an entire area of the upper surface of the sticker material; and a thickness adjustment step in which the cured film presses the sticker material to adjust the thickness of the sticker material.

In the sticker peeling step, each of the antireflection structures formed on the upper surface of the ultra-thin antireflection sticker may form a semi-spherical groove shape.

In accordance with another aspect of the present invention, an ultra-thin antireflection sticker includes: a base having a flat plate shape; and a plurality of antireflection structures each protruding from an upper surface of the base to form a semispherical groove shape, wherein the base and the antireflection structures are integrally formed with each other and are formed of the same material.

The ultra-thin antireflection sticker manufacturing method and the ultra-thin antireflection sticker according to the present invention have effects as follows.

First, a monolayer-structured ultra-thin antireflection sticker having a plurality of antireflection structures on an upper surface thereof can be manufactured and thus can be advantageously applied to a high efficiency flexible device.

Secondly, the ultra-thin antireflection sticker can be manufactured to a thin thickness of about 20 μm in a monolayer structure, thereby improving mechanical stability of a perovskite solar cell through reduction in stress applied to a perovskite layer.

Thirdly, the plurality of antireflection structures on the upper surface of the ultra-thin antireflection sticker is formed in a moth-eye type conical structure, thereby improving an antireflection effect through structural inclination of incident light from air to a substrate.

Fourthly, the ultra-thin antireflection sticker according to the present invention can be advantageously attached to outer surfaces of various devices including solar cells and the like without a separate bonding layer or a separate bonding agent due to characteristics of perfluorinated polyether (PFPE) materials per se and a thin thickness of the monolayer structure.

DRAWINGS

The above and other aspects, features, and advantages of the present invention will become apparent from the detailed description of the following embodiments in conjunction with the accompanying drawings.

Figure 19:
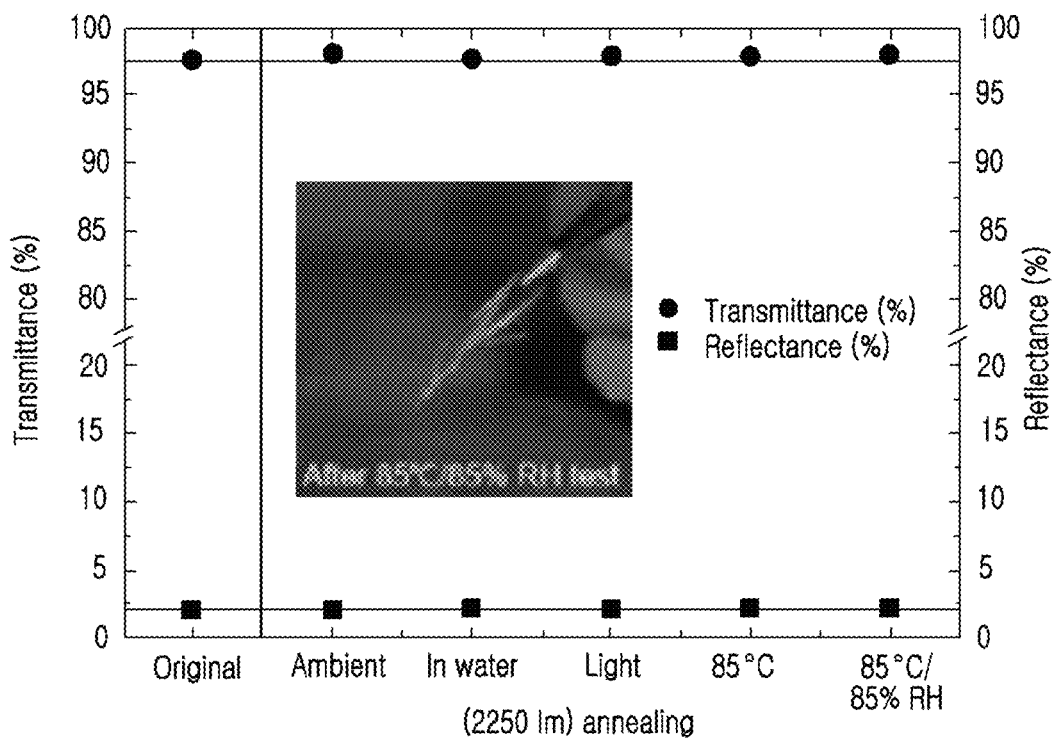
Figure 20:
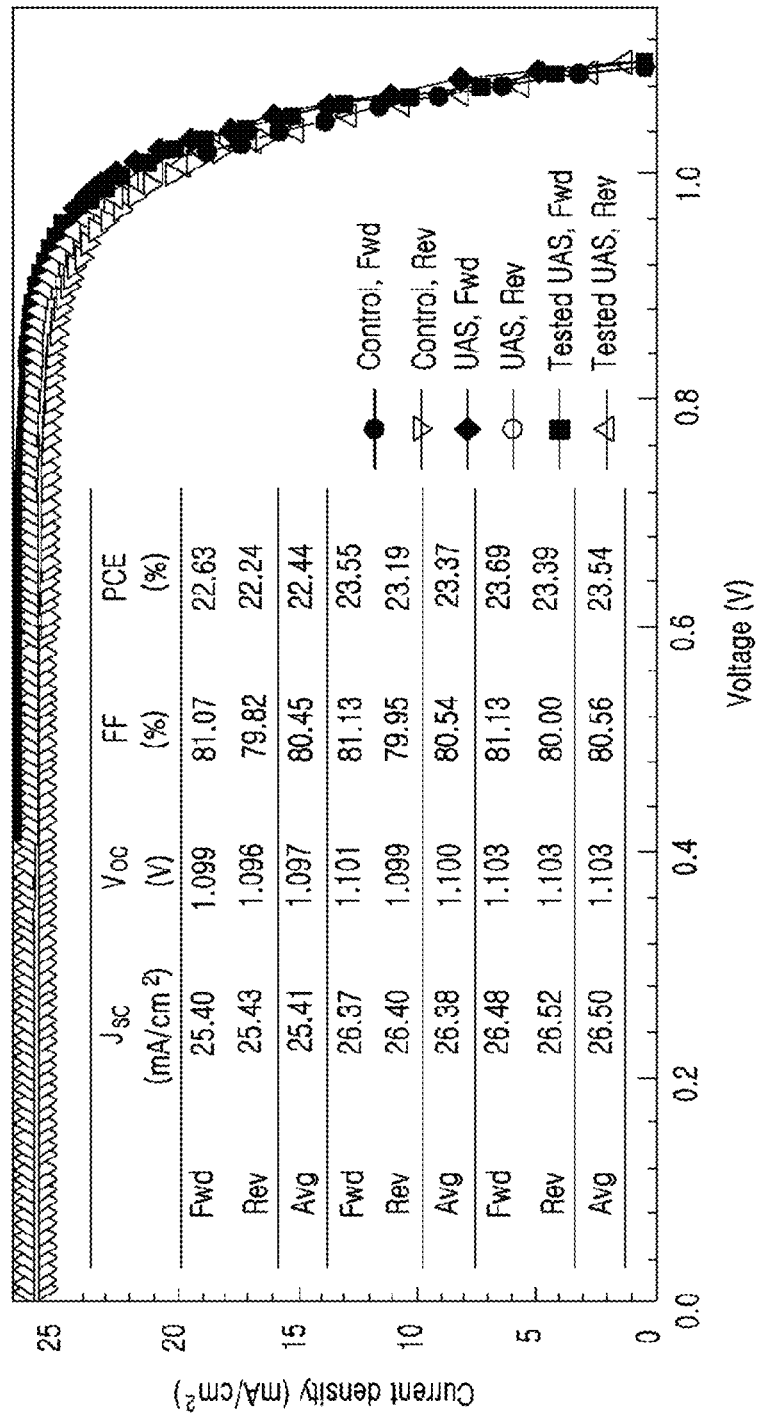
Figure 21:
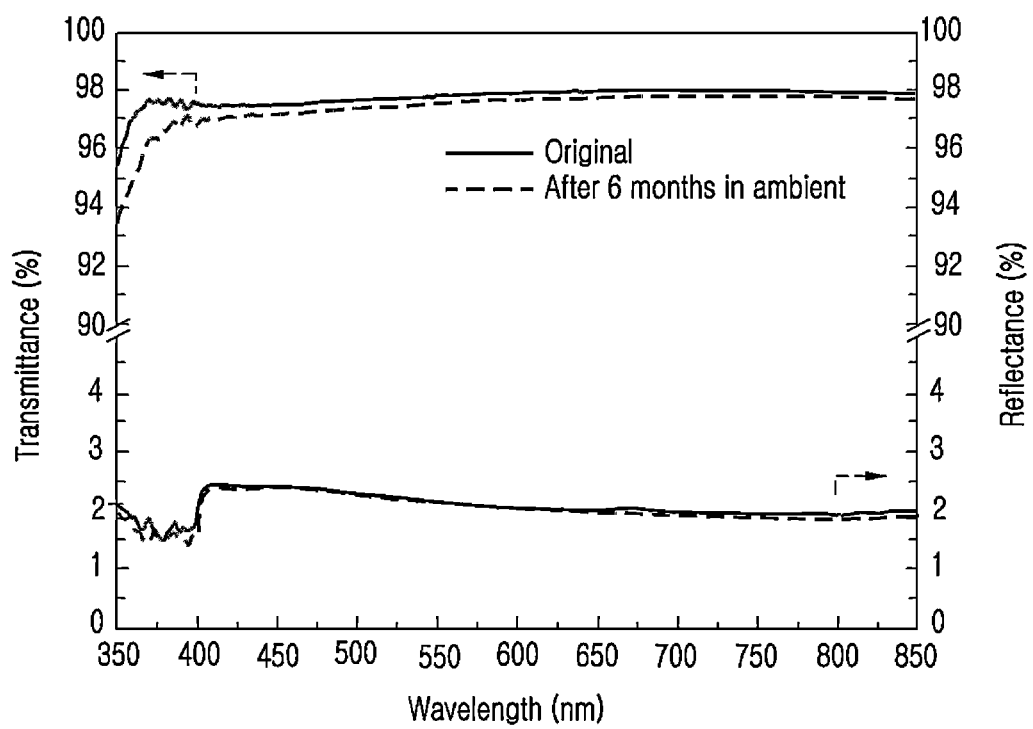

FIG. 6~FIG. 9 are views illustrating functional characteristics of the ultra-thin antireflection sticker manufactured by the ultra-thin antireflection sticker manufacturing method according to the present invention;

FIG. 10~FIG. 16 are views illustrating performance of a perovskite solar cell to which the ultra-thin antireflection sticker manufactured by the ultra-thin antireflection sticker manufacturing method according to the present invention is applied;

FIG. 17~FIG. 20 are views illustrating stability of the ultra-thin antireflection sticker manufactured by the ultra-thin antireflection sticker manufacturing method according to the present invention; and FIG. 21 is a view illustrating long-term stability of the ultra-thin antireflection sticker manufactured by the ultra-thin antireflection sticker manufacturing method according to the present invention.

DETAILED DESCRIPTION

Hereinafter, exemplary embodiments of the present invention will be described with reference to the accompanying drawings. However, it should be understood that the present invention is not limited to the following embodiments and may be embodied in different ways. In addition, it should be understood that the following embodiments are provided for complete disclosure and thorough understanding of the present invention by those skilled in the art, and that the present invention is defined only by the scope of claims. Like components will be denoted by like reference numerals throughout the specification.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

When an element is referred to as being "connected to," or "coupled to" another element, it may be directly connected or coupled to the other element or intervening elements may be present. However, when an element is referred to as being "directly connected to," or "directly coupled to" another element, there are no intervening elements present. Other expressions for description of relationship between components should also be interpreted in the same manner.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Figure 1:
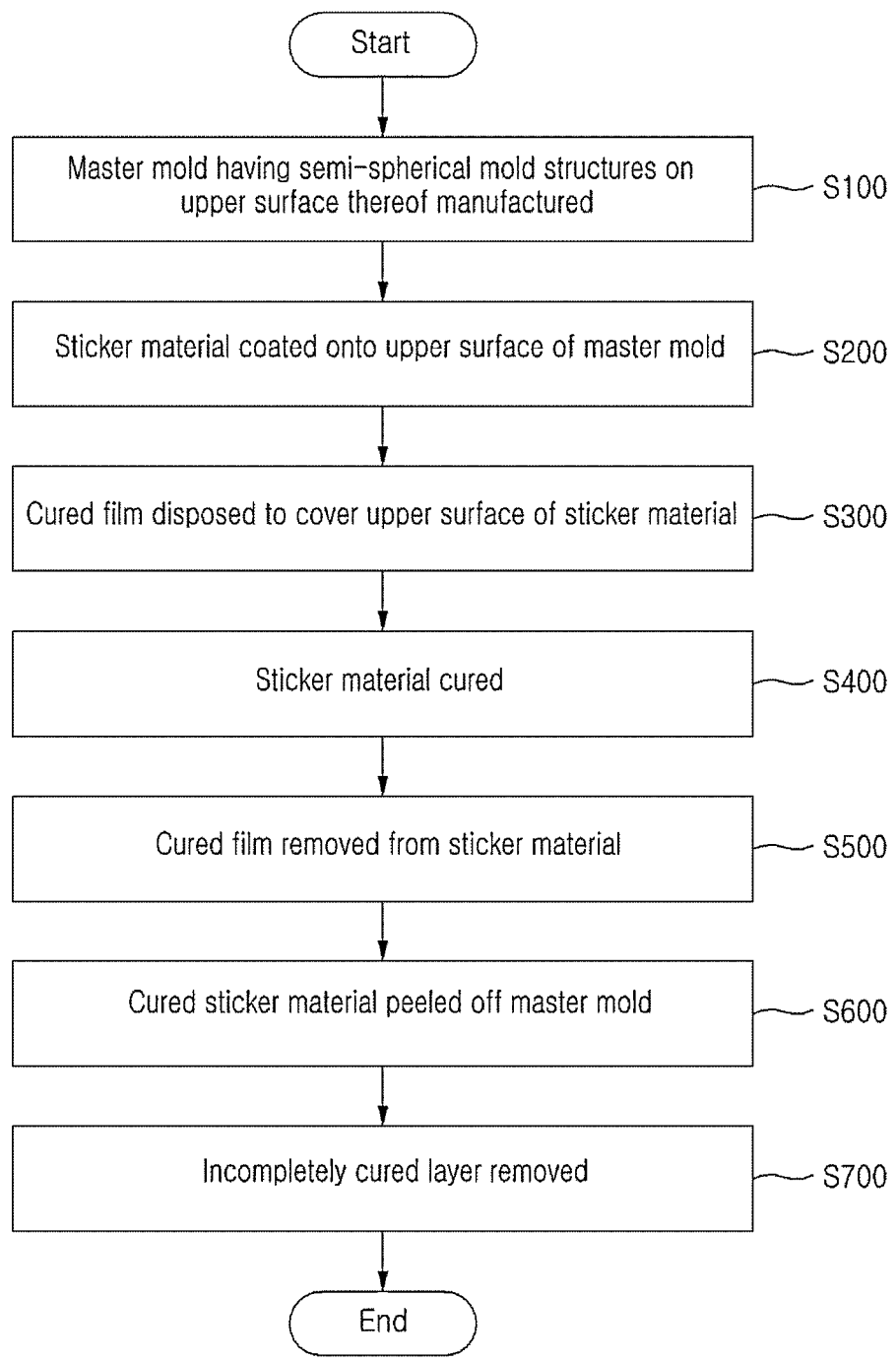
FIG. 1 is a block diagram showing a method of manufacturing an ultra-thin antireflection sticker according to the present invention.
Figure 2:
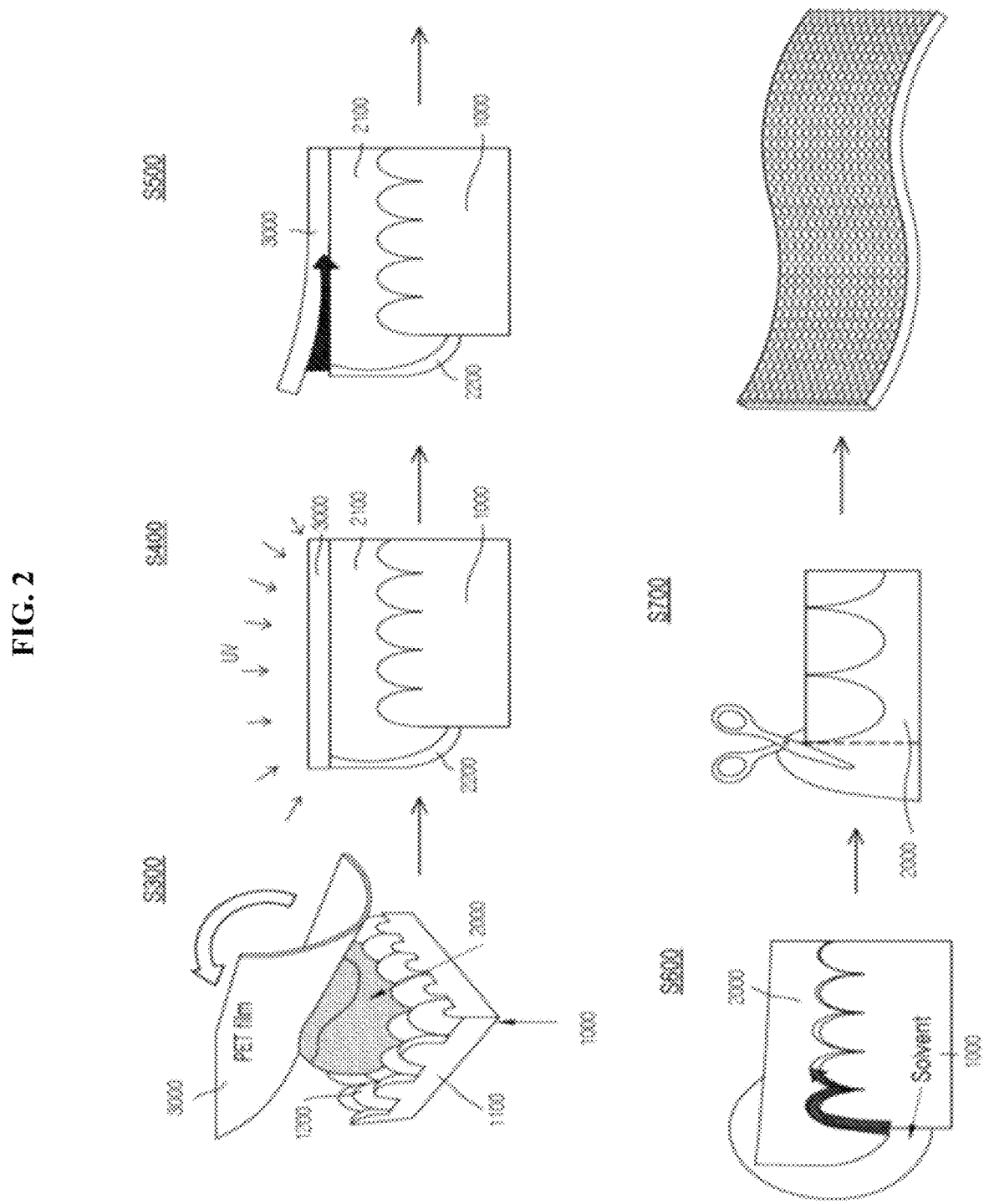
FIG. 2 is a diagram illustrating processes in the method of manufacturing an ultra-thin antireflection sticker according to the present invention.

FIG. 1 is a block diagram showing a method of manufacturing an ultra-thin antireflection sticker according to the present invention and FIG. 2 is a diagram illustrating processes in the method of manufacturing an ultra-thin antireflection sticker according to the present invention. Referring to FIG. 1 and FIG. 2, the method of manufacturing an ultra-thin antireflection sticker according to the present invention includes: a master mold manufacturing step S100, a sticker material coating step S200, a cured film covering step S300, a curing step S400, a cured film removal step S500, a sticker peeling step S600, and an incompletely cured layer removal step S700.

In the master mold manufacturing step S100, a master mold 1000 having a plurality of semi-spherical mold structures 1200 on an upper surface thereof is manufactured.

Here, each of the mold structures 1200 protrudes in a semi-spherical shape on an upper surface of the mold base 1100 having a flat plate shape and may have a diameter of 280 nm to 320 nm and a height of 180 nm to 220 nm. Preferably, the mold structure 1200 has a diameter of 300 nm and a height of 200 nm.

The master mold 1000 is preferably formed of silicon.

In the sticker material coating step S200, a sticker material 2000 is coated onto the entire area of the upper surface of the master mold 1000. The sticker material 2000 is formed of perfluorinated polyether (PFPE).

In the cured film covering step S300, a cured film 3000 is disposed to cover an upper surface of the sticker material 2000 coated on the upper surface of the master mold 1000. Specifically, the cured film covering step S300 includes a covering step and a thickness adjustment step.

In the covering step, the cured film 3000 is disposed to cover the entire area of the upper surface of the sticker material 2000. Here, the cured film is formed of a transparent PET material, whereby the sticker material 2000 can be cured by UV light permeating the sticker material 2000 through the cured film in the curing step S4000 described below.

In the thickness adjustment step, the cured film 3000 presses the sticker material 2000 to adjust the thickness of the sticker material 2000.

Here, in the thickness adjustment step, the thickness of the sticker material 2000 is adjusted by allowing the cured film 3000 to press the sticker material 2000 until the total thickness of the sticker material 2000 reaches 20 μm.

In the curing step S400, the sticker material 2000 is subjected to UV curing. As the curing step S400 is carried out, the sticker material 2000 is partially cured to form a completely cured layer 2100 and an incompletely cured layer 2200.

When the sticker material 2000 formed of perfluoropolyether contacts oxygen upon UV curing, a surface of the sticker material contacting oxygen becomes incompletely cured even after UV curing.

Although the entire area of the upper surface of the sticker material 2000 is covered with the cured film 3000 in the covering step, a side surface area of the sticker material 2000 is exposed to air and becomes the incompletely cured layer 2200.

Specifically, the sticker material 2000 is blocked from air by the cured film 3000 covering the entire area of the upper surface of the sticker material 2000, whereby the area of the sticker material covered with the cured film 3000 forms the completely cured layer 2100 in which the sticker material 2000 is completely cured.

In addition, since the side surface area of the sticker material 2000 not covered with the cured film 3000 is exposed to air, the incompletely cured layer 2200 is generated due to contact of the sticker material 2000 with oxygen when the sticker material 2000 is cured by UV light in the curing step S400.

In the cured film removal step S500, the cured film 3000 is removed from the sticker material 2000.

Here, in the cured film removal step S500, the cured film 3000 is removed from the sticker material 2000 based on bonding energy between the master mold 1000, the sticker material 2000 and the cured film 3000.

Specifically, bonding energy (PFPE-silicon) between the master mold 1000 and the sticker material 2000 is up to 5.526 μJ, which is determined by the shape of the bonding area therebetween, that is, by the shape of the mold structure 1200. In addition, bonding energy (PET-PFPE) between the sticker material 2000 and the cured film 3000 is up to 3.683 μJ, causing preferential separation between the sticker material 2000 and the cured film 3000.

In the cured film removal step S500, the side surface of the sticker material 2000 becomes the incompletely cured layer 2200, thereby facilitating preferential separation between the master mold 1000 and the sticker material 2000. When separation of the sticker material 2000 from the side surface of the master mold 1000 is started, separation between the master mold 1000 and the sticker material 2000 is also easily carried out in the completely cured layer 2100.

In the sticker peeling step S600, the cured sticker material 2000 is peeled off the master mold 1000. Specifically, the sticker peeling step S600 includes a solvent spraying step and a monolayer sticker formation step.

In the solvent spraying step, a solvent is sprayed onto the side surface of the sticker material 2000 and penetrates a space between the master mold 1000 and the side surface of the sticker material 2000 by capillary action to remove bonding strength between the master mold 1000 and the sticker material 2000.

As a result, the sticker material 2000 can be prevented from tearing, which can occur upon forcible separation when the bonding strength between the master mold 1000 and the side surface area of the sticker material 2000 is not removed by the solvent spraying step. The solvent may be acetone.

In the monolayer sticker formation step, as the bonding strength between the master mold 1000 and the side surface area of the sticker material 2000 is removed, the cured sticker material 2000 is peeled off the master mold 1000 on the side surface of the sticker material 2000. Here, the peeled-off sticker material 2000 forms a monolayer-structured ultra-thin antireflection sticker having a plurality of antireflection structures 200 on an upper surface thereof. Details of the ultra-thin antireflection sticker will be described below.

In the incompletely cured layer removal step S700, the incompletely cured layer 2200 and the side surface area of the sticker material 2000 damaged by the solvent sprayed in the solvent spraying step, that is, the side surface area of the ultra-thin antireflection sticker, are removed by cutting, whereby the entire area of the ultra-thin antireflection sticker can have uniform antireflection effects.

Figure 3:
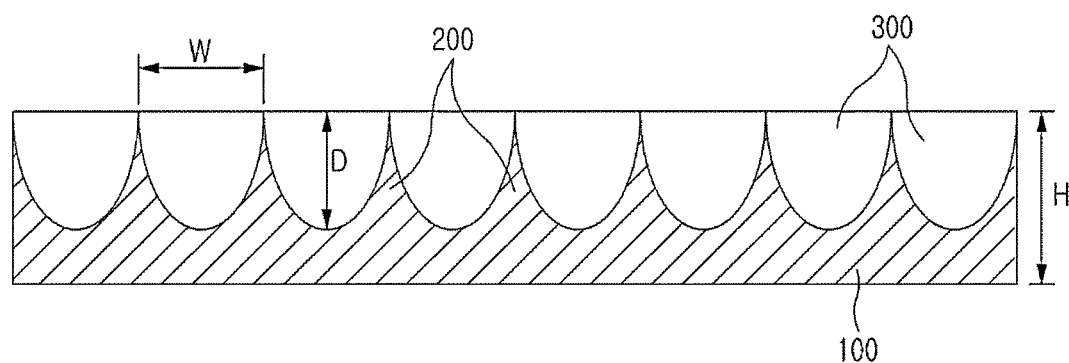
FIG. 3 is a schematic view of an ultra-thin antireflection sticker according to the present invention manufactured by the ultra-thin antireflection sticker manufacturing method according to the present invention.
Figure 4:
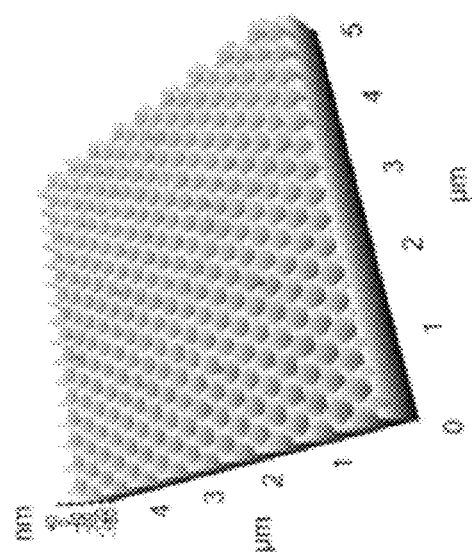
FIG. 4 is SEM and AFM images of the ultra-thin antireflection sticker manufactured by the ultra-thin antireflection sticker manufacturing method according to the present invention.
Figure 4:
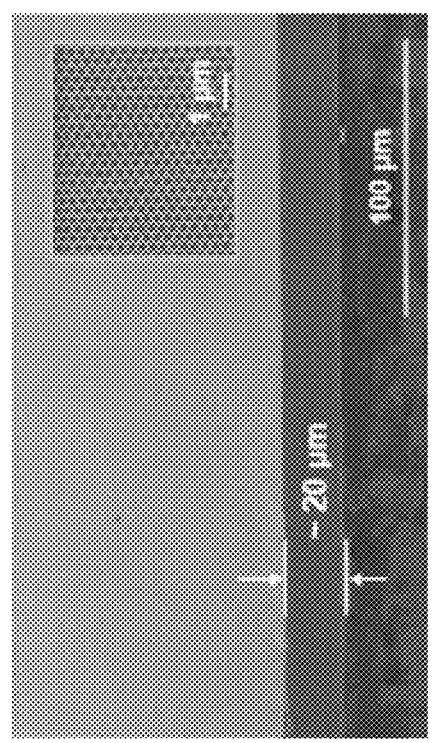
Figure 4:
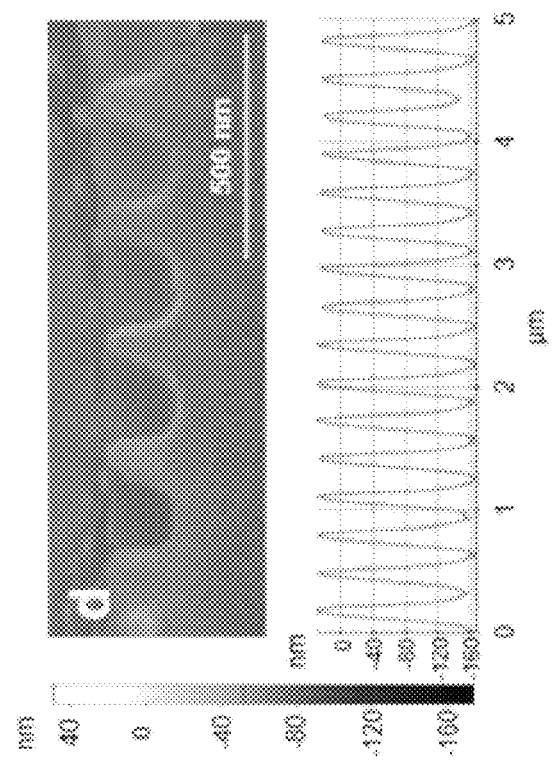

FIG. 3 is a schematic view of an ultra-thin antireflection sticker according to the present invention manufactured by the ultra-thin antireflection sticker manufacturing method according to the present invention and FIG. 4 is SEM and AFM images of the ultra-thin antireflection sticker manufactured by the ultra-thin antireflection sticker manufacturing method according to the present invention, in which the ultra-thin antireflection sticker according to the present invention includes a base 100 and antireflection structures 200.

The base 100 has a flat plate shape and is attached at a lower surface thereof to a product requiring an antireflection function, such as a perovskite solar cell and the like.

The antireflection structures 200 protrude from an upper surface of the base 100 to form a plurality of semispherical antireflection grooves 300 arranged at constant intervals.

The antireflection grooves 300 have a diameter D of 280 nm to 320 nm and a height D of 180 nm to 220 nm and are formed by the mold structure 1200, in which the total thickness H of the base 100 and the antireflection structure 200 is 20 μm.

Here, the base 100 and the antireflection structures 200 are integrally formed with each other to form a single layer and are formed of the same material. The base 100 and the antireflection structures 200 may be formed of perfluoropolyether.

As described above, the ultra-thin antireflection sticker according to the present invention is formed on an upper surface thereof with a plurality of antireflection structures 200 and has a monolayer structure. Thus, the ultra-thin antireflection sticker according to the present invention may be applied to a high efficiency flexible device and may be manufactured in a monolayer structure having a thickness of about 20 μm, thereby improving mechanical stability of a flexible perovskite solar cell through reduction in stress applied to the perovskite layer to which the ultra-thin antireflection sticker is attached.

In addition, the moth-eye type conical structures, that is, the antireflection grooves 300, are formed by the antireflection structures 200, thereby improving an antireflection effect through structural inclination of incident light from air to a substrate.

Figure 5:
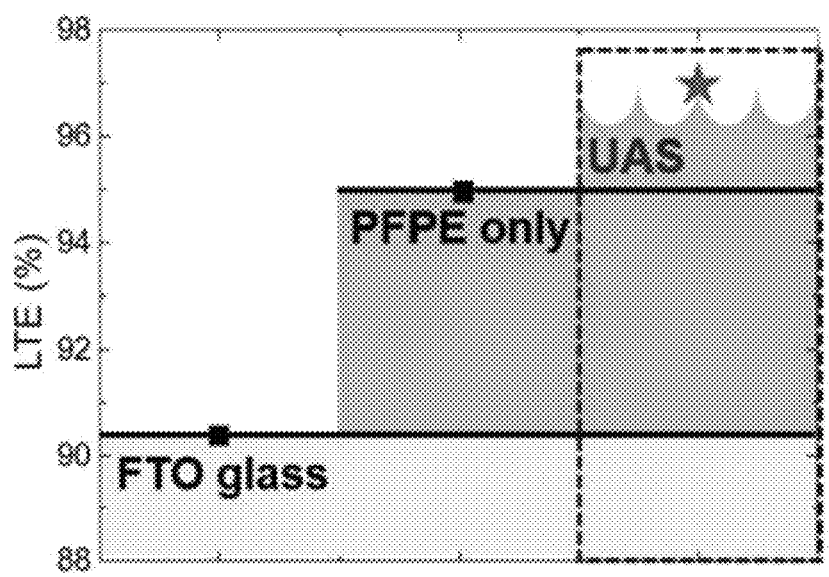
FIG. 5 is a view illustrating light transmittance efficiency and reflectance of an antireflection structure of the ultra-thin antireflection sticker manufactured by the ultra-thin antireflection sticker manufacturing method according to the present invention.
Figure 5:
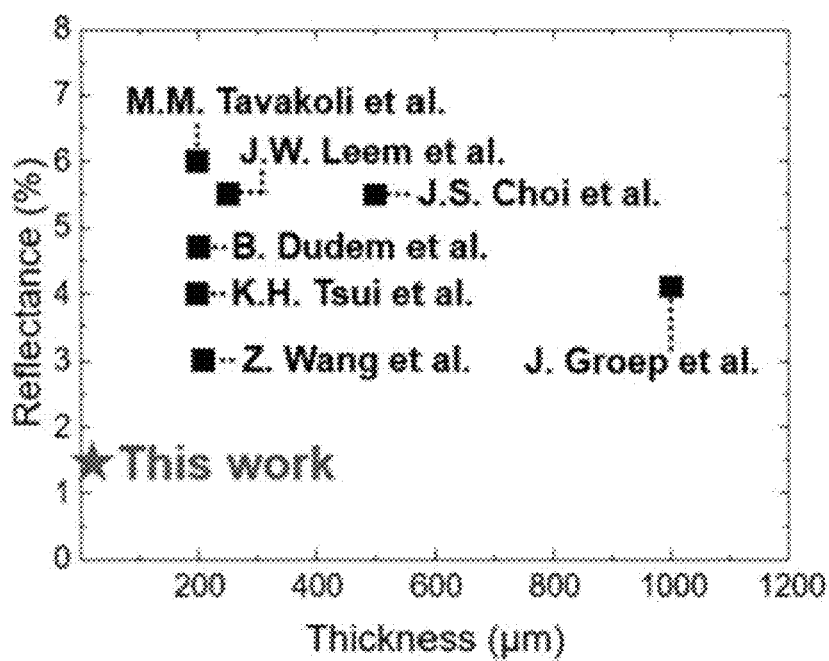

FIG. 5 is a view illustrating light transmittance efficiency and reflectance of the antireflection structures 200 of the ultra-thin antireflection sticker manufactured by the ultra-thin antireflection sticker manufacturing method according to the present invention.

FIG. 5(a) is a graph depicting light transmittance efficiency of a typical perfluoropolyether film having no antireflection structures 200 on FTO glass and light transmittance efficiency of the ultra-thin antireflection sticker according to the present invention, showing that the ultra-thin antireflection sticker according to the present invention has higher light transmittance efficiency than the typical perfluoropolyether film.

FIG. 5(b) is a graph depicting thickness and reflectance of a typical perfluoropolyether film and the ultra-thin antireflection sticker according to the present invention, showing that the ultra-thin antireflection sticker according to the present invention has a much thinner thickness and lower reflectance than the typical perfluoropolyether film.

FIG. 6~FIG. 9 are views illustrating functional characteristics of the ultra-thin antireflection sticker manufactured by the ultra-thin antireflection sticker manufacturing method according to the present invention.

Figure 6:
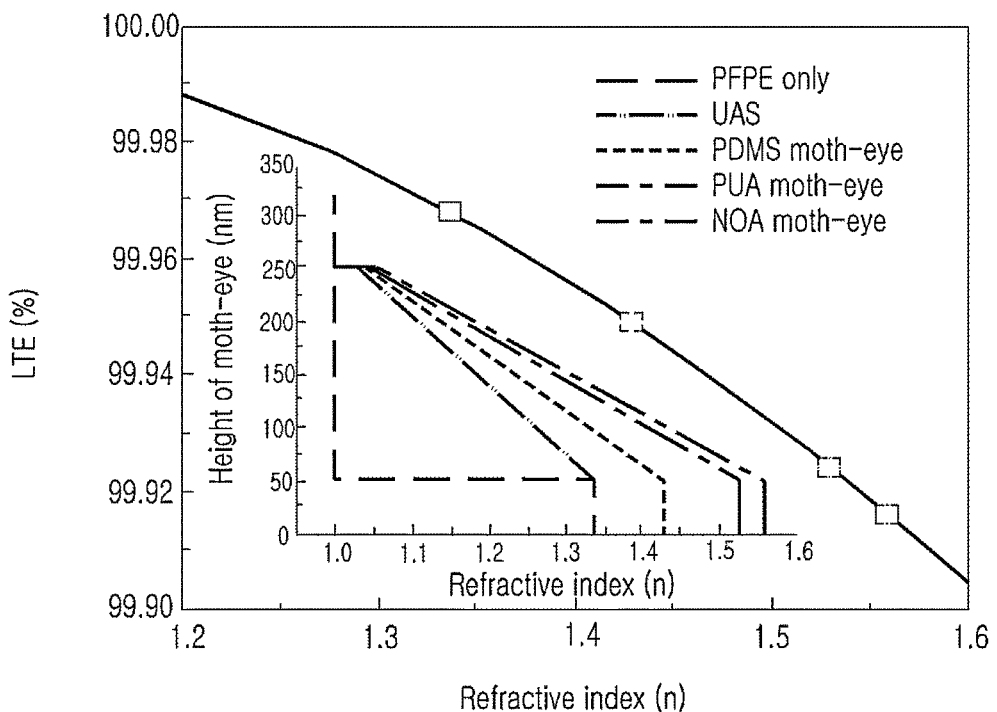

FIG. 6 is a graph depicting light transmittance efficiency of an ultra-thin antireflection sticker (UAS) according to the present invention and control films, which are a typical perfluoropolyether film, an antireflection structure-containing polydimethylsiloxane film (PDMS moth-eye), a polyurethane acrylate film (PUA), and a Norland optical adhesive film (NOA).

Referring to FIG. 6, the typical perfluoropolyether film exhibited abrupt change in surface refractive index(n from 1 to 1.337) at an interface between air and the typical perfluoropolyether film, whereas the ultra-thin antireflection sticker (UAS) according to the present invention exhibits surface refractive index gradually increasing from an upper end of a nano-structure (height: 200 nm).

In particular, the ultra-thin antireflection sticker (UAS) according to the present invention exhibits efficiently gradual change in refractive index of by adopting a perfluoropolyether resin having a lower refractive index of than other polymers. In addition, the ultra-thin antireflection sticker (UAS) having the lowest variation in refractive index of has an LTE of 99.97%, which is a better value than any other control films, indicating that the ultra-thin antireflection sticker (UAS) according to the present invention is the most effective in improvement in LTE.

Figure 7:
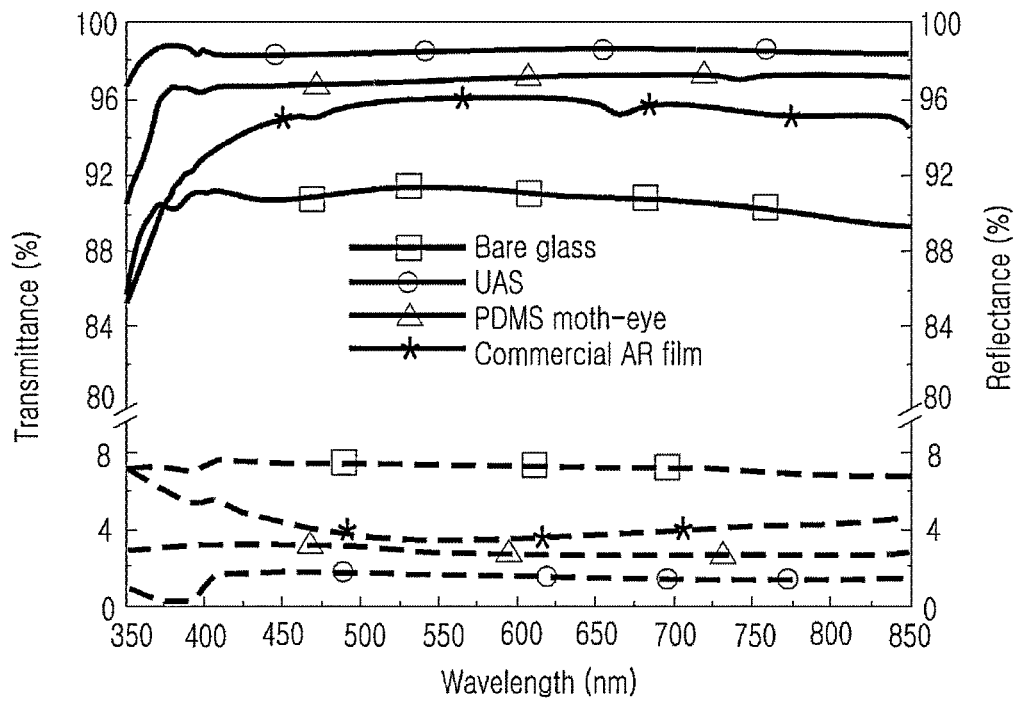

FIG. 7 is a graph depicting transmittance and reflectance of an ultra-thin antireflection sticker (UAS) according to the present invention and control films, which are bare glass, an antireflection structure-containing polydimethylsiloxane (PDMS moth-eye) film and a commercial antireflection film (Commercial AR film).

Referring to FIG. 7, the commercial antireflection film has an average transmittance of 94.85% and a reflectance of 4.20%, and the polydimethylsiloxane (PDMS moth-eye) film has a transmittance of 96.89% and a reflectance of 2.88%, whereas the ultra-thin antireflection sticker (UAS) according to the present invention has a transmittance of 98.43% and a reflectance of 1.43%. From this result, it can be confirmed that the ultra-thin antireflection sticker (UAS) according to the present invention has not only excellent optical characteristics but also a stable graph of the optical characteristics without change in overall wavelengths, as compared to the control films.

Figure 8:
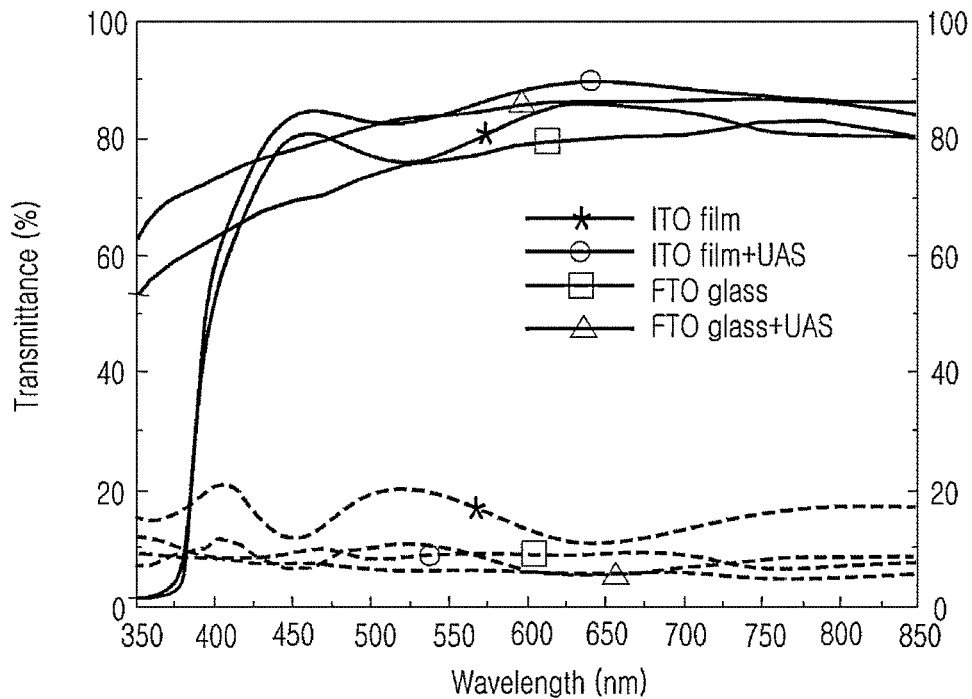

FIG. 8 is a graph depicting transmittance and reflectance of an ITO (indium-tin oxide) film and an FTO glass substrate used as substrates for optical devices, to which the ultra-thin antireflection sticker (UAS) is applied.

Referring to FIG. 8, it can be confirmed that the ultra-thin antireflection sticker (UAS) according to the present invention enhances transmittance by 4.59% while reducing reflectance by 7.54% in the ITO film, and enhances transmittance by 6.93% while reduces reflectance by 2.59% in the FTO.

Accordingly, when the ultra-thin antireflection sticker (UAS) according to the present invention is attached to a transparent electrode substrate, it can be anticipated that the ultra-thin antireflection sticker (UAS) according to the present invention increases short circuit current density through increase in LTE depending on the quantity of light transmitted to the perovskite solar cell.

Figure 9:
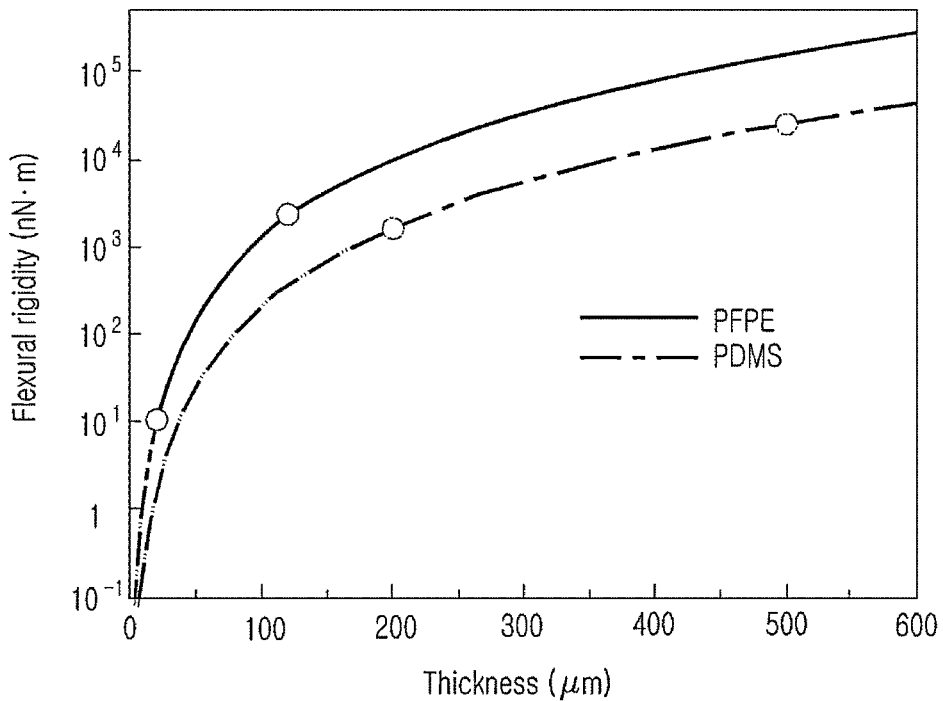

FIG. 9 is a graph depicting flexural rigidity depending upon thickness of perfluoropolyether and polydimethylsiloxane materials, in which the minimum thickness of the polydimethylsiloxane material was limited to 200 μm due to process constraints and, although the perfluoropolyether material could be fabricated down to 10 μm, the ultra-thin antireflection sticker (UAS) according to the present invention was formed to a thickness of 20 μm for stable yield and convenience in manufacture. The ultra-thin antireflection sticker (UAS) according to the present invention has a flexural rigidity of 10 nN·m and can be used as a sticker using bonding strength via Van der Waals force. As a result, the ultra-thin antireflection sticker (UAS) according to the present invention can be attached to the perovskite solar cell without separate adhesives.

FIG. 10~FIG. 16 are views illustrating performance of a perovskite solar cell to which the ultra-thin antireflection sticker manufactured by the ultra-thin antireflection sticker manufacturing method according to the present invention is applied.

Figure 10:
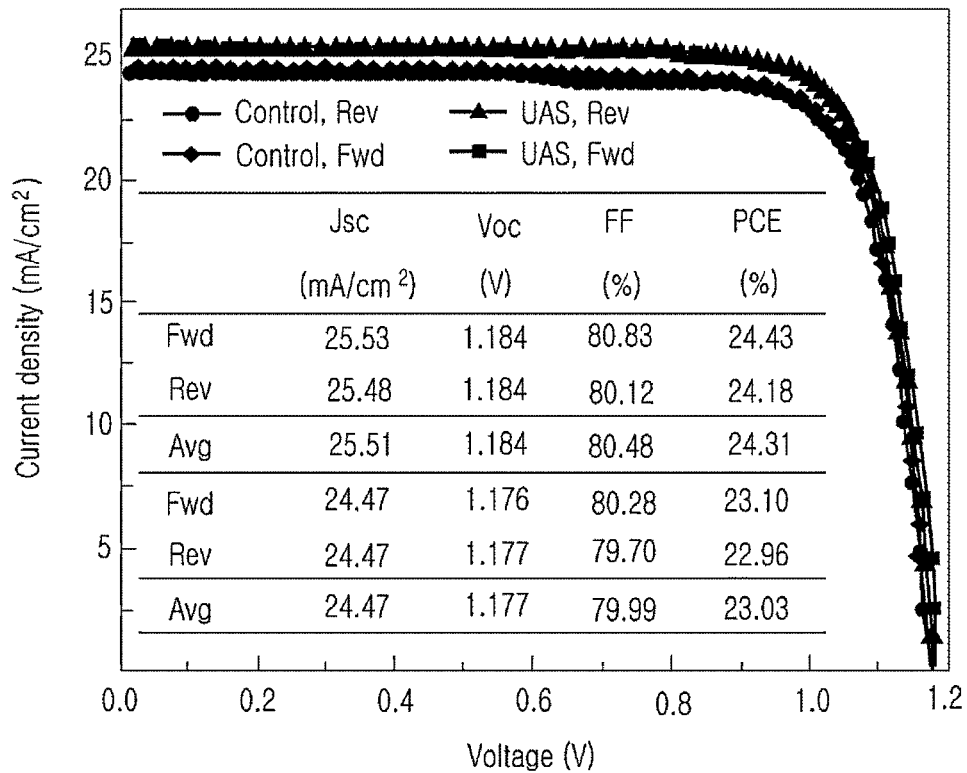
Figure 11:
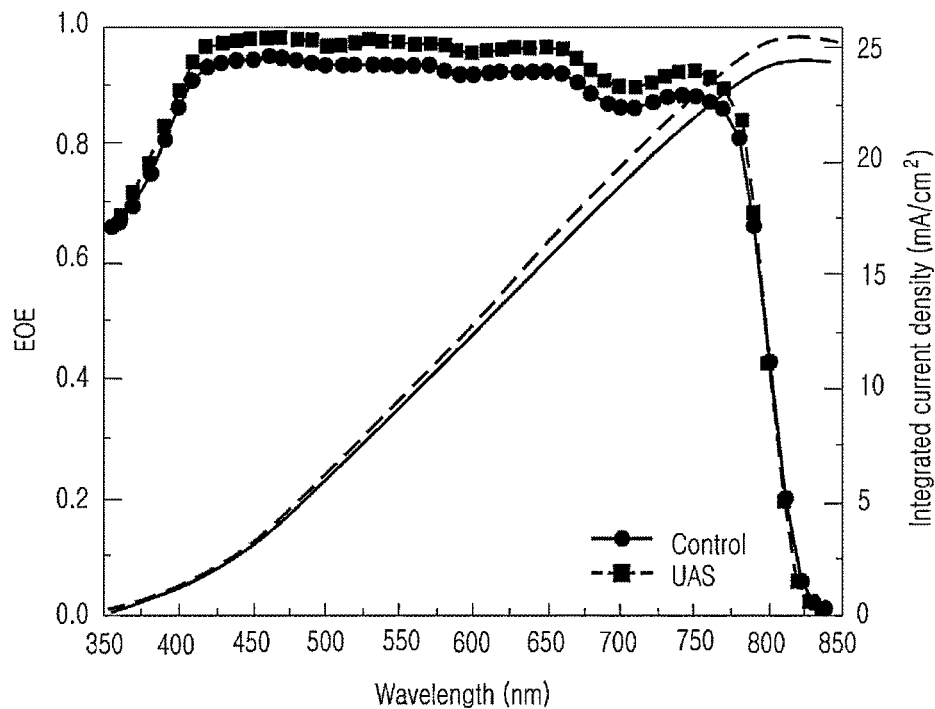

FIG. 10 and FIG. 11 are graphs depicting a current density-voltage J-V curve and external quantum efficiency (EQE) of a rigid perovskite solar cell.

As shown in FIG. 10 and FIG. 11, the ultra-thin antireflection sticker manufactured by the ultra-thin antireflection sticker manufacturing method according to the present invention improves performance of the perovskite solar cell by increasing the quantity of light reaching a device.

A control solar cell device (rigid substrate) described below used a three-dimensional perovskite layer processed with two-dimensional perovskite through a solid in-situ growth method, as a light absorbing layer, in which the thickness of the light absorbing layer was 550 nm, as confirmed in an SEM image.

Referring to FIG. 10 and FIG. 11, it could be confirmed that the short circuit current density of the control solar cell device (rigid substrate) was increased to 25.51 mA/cm$^2$ (forward scan: 25.53, reverse scan: 25.48) and the average efficiency of the control solar cell device (rigid substrate) was increased to 24.31% by increasing 1.28% (forward scan: 24.43, reverse scan: 24.18) through the ultra-thin antireflection sticker manufactured by the ultra-thin antireflection sticker manufacturing method according to the present invention.

In addition, it could be confirmed that, as calculated based on the external quantum efficiency, the short circuit current density was increased from 24.47 mA/cm$^2$ for the control solar cell device (rigid substrate) to 25.52 mA/cm$^2$ for a device employing the ultra-thin antireflection sticker manufactured by the ultra-thin antireflection sticker manufacturing method according to the present invention and each value was similar to a value directly obtained from the J-V curve.

That is, in the wavelength range of 400 nm to 800 nm, the short circuit current density is uniformly improved and reaches 98.4% at a wavelength of 460 nm.

Consequently, it can be seen that the increase in short circuit current density is caused by the ultra-thin antireflection sticker manufactured by the ultra-thin antireflection sticker manufacturing method according to the present invention, which allows more photons to reach the perovskite layer through suppression of reflection of external light, rather than a fundamental factor of the device, such as transferability of a light absorption material.

Figure 12:
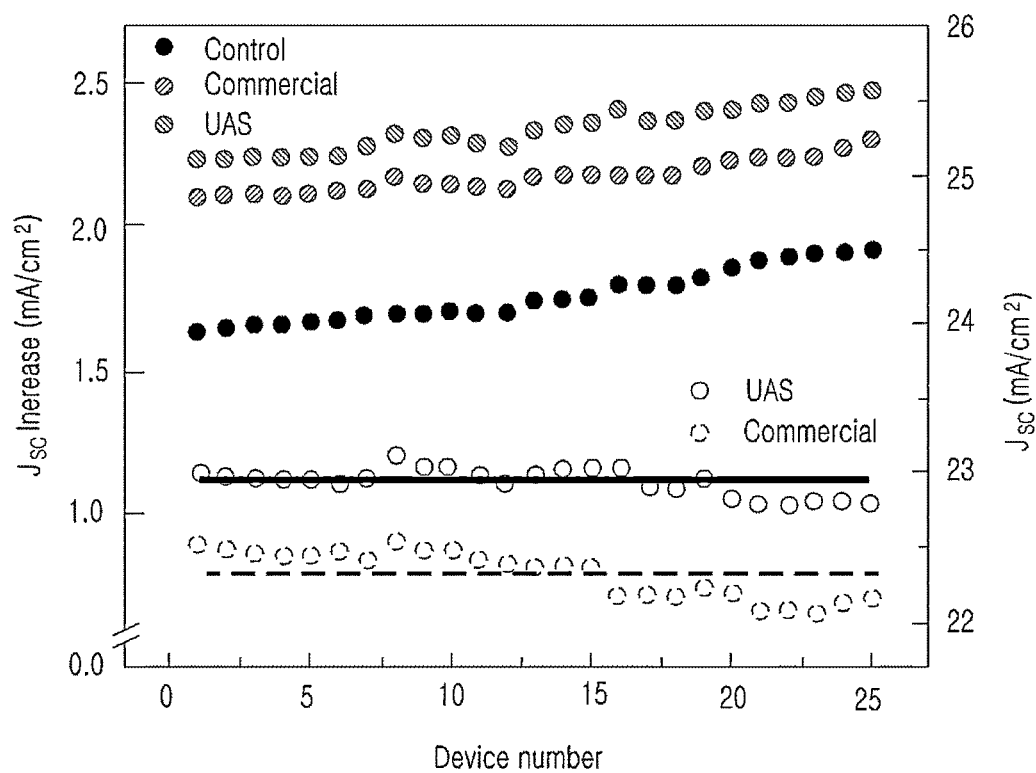

FIG. 12 is a graph depicting an increase rate in short circuit current density (Jsc) of the perovskite solar cell under three conditions.

Referring to FIG. 12, in the same groups of devices, a device adopting a commercially available antireflection film in the art exhibits an increase in short circuit current density by an average of 0.80 mA/cm$^2$, whereas a device adopting the ultra-thin antireflection sticker manufactured by the ultra-thin antireflection sticker manufacturing method according to the present invention exhibits an increase in short circuit current density by an average of 1.12 mA/cm$^2$, indicating better antireflection effects.

Figure 13:
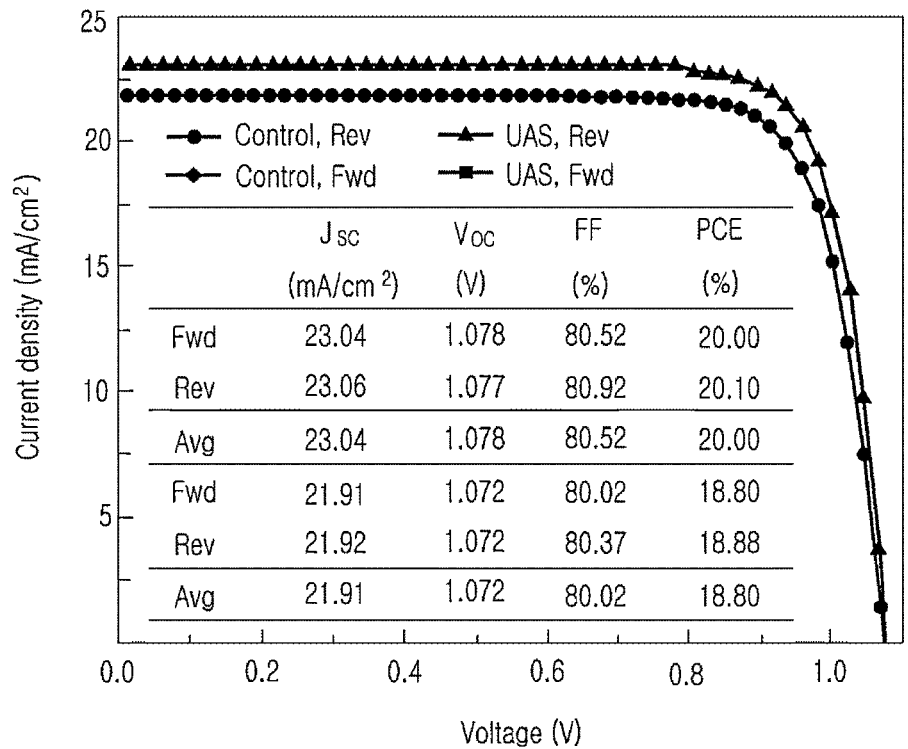
Figure 14:
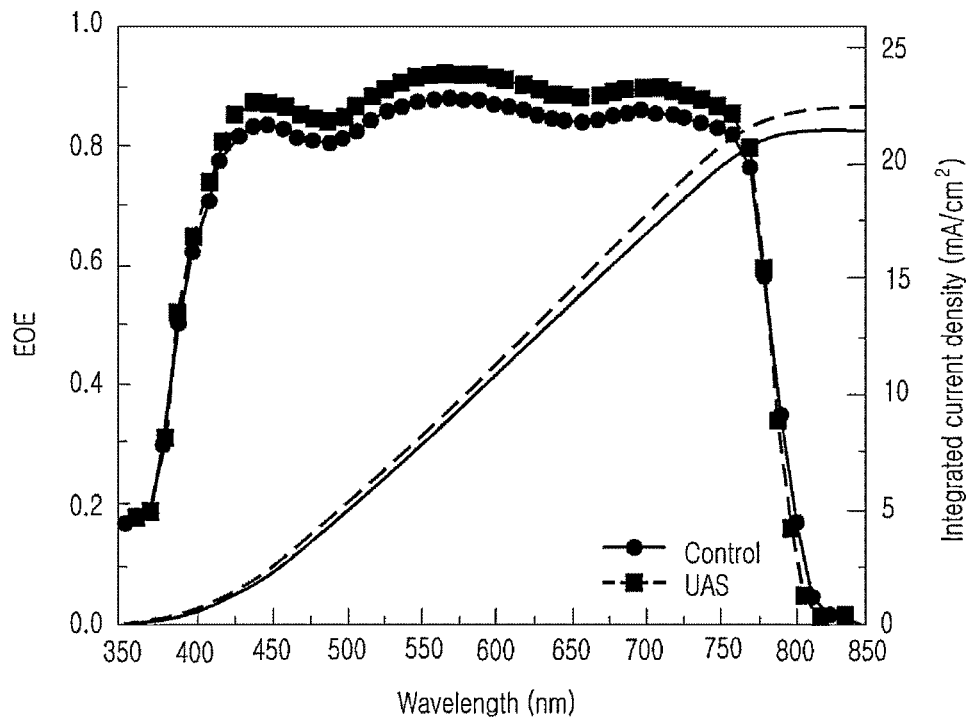

FIG. 13 and FIG. 14 are graphs depicting a current density-voltage J-V curve and external quantum efficiency (EQE) of a flexible perovskite solar cell.

As shown in FIG. 13 and FIG. 14, it can be seen that the short circuit current density of the device adopting the ultra-thin antireflection sticker manufactured by the ultra-thin antireflection sticker manufacturing method according to the present invention is increased to 23.04 mA/cm$^2$ (forward scan: 23.04, reverse scan: 23.06) by 1.13 mA/cm$^2$, and that the average efficiency is increased from 18.80% (forward scan: 18.80, reverse scan: 18.88) to 20.00% (forward scan: 20.00, reverse scan: 20.10) by 1.2% by the ultra-thin antireflection sticker according to the present invention.

In addition, it can be confirmed that the external quantum efficiency of the device adopting the ultra-thin antireflection sticker according to the present invention is uniformly increased in the wavelength range of 350 nm to 850 nm.

Consequently, for different compositions of three-dimensional perovskite, the ultra-thin antireflection sticker according to the present invention allows a greater quantity of light to reach the perovskite layer.

Figure 15:
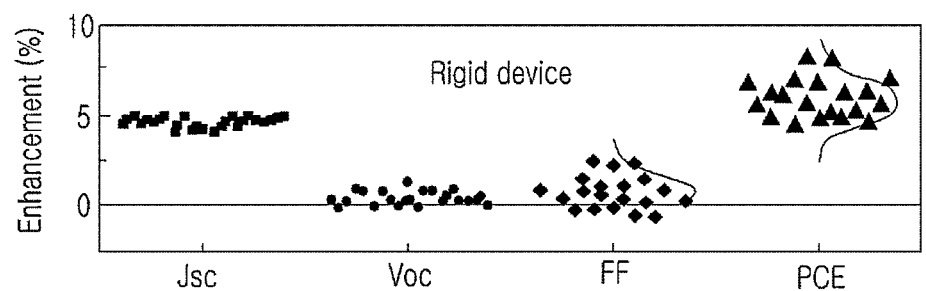
Figure 16:
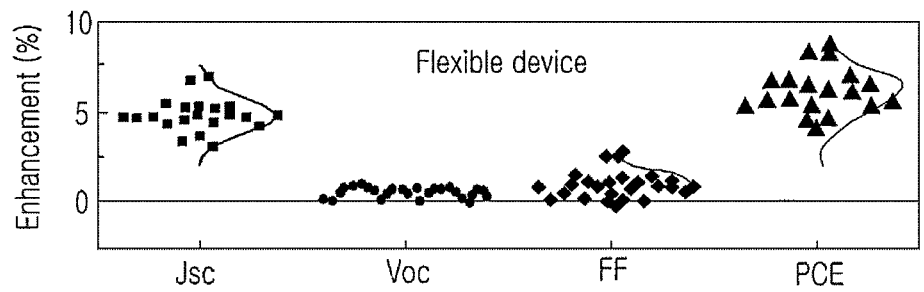

FIG. 15 and FIG. 16 are graphs depicting statistical distributions of photoelectric performance of rigid and flexible perovskite solar cells adopting the ultra-thin antireflection sticker according to the present invention. Referring to FIG. 15 and FIG. 16, it can be seen that both the rigid perovskite solar cell and the flexible perovskite solar cell exhibits performance enhancement through improvement in short circuit current density.

FIG. 17~FIG. 20 are views illustrating stability of the ultra-thin antireflection sticker manufactured by the ultra-thin antireflection sticker manufacturing method according to the present invention.

Figure 17:
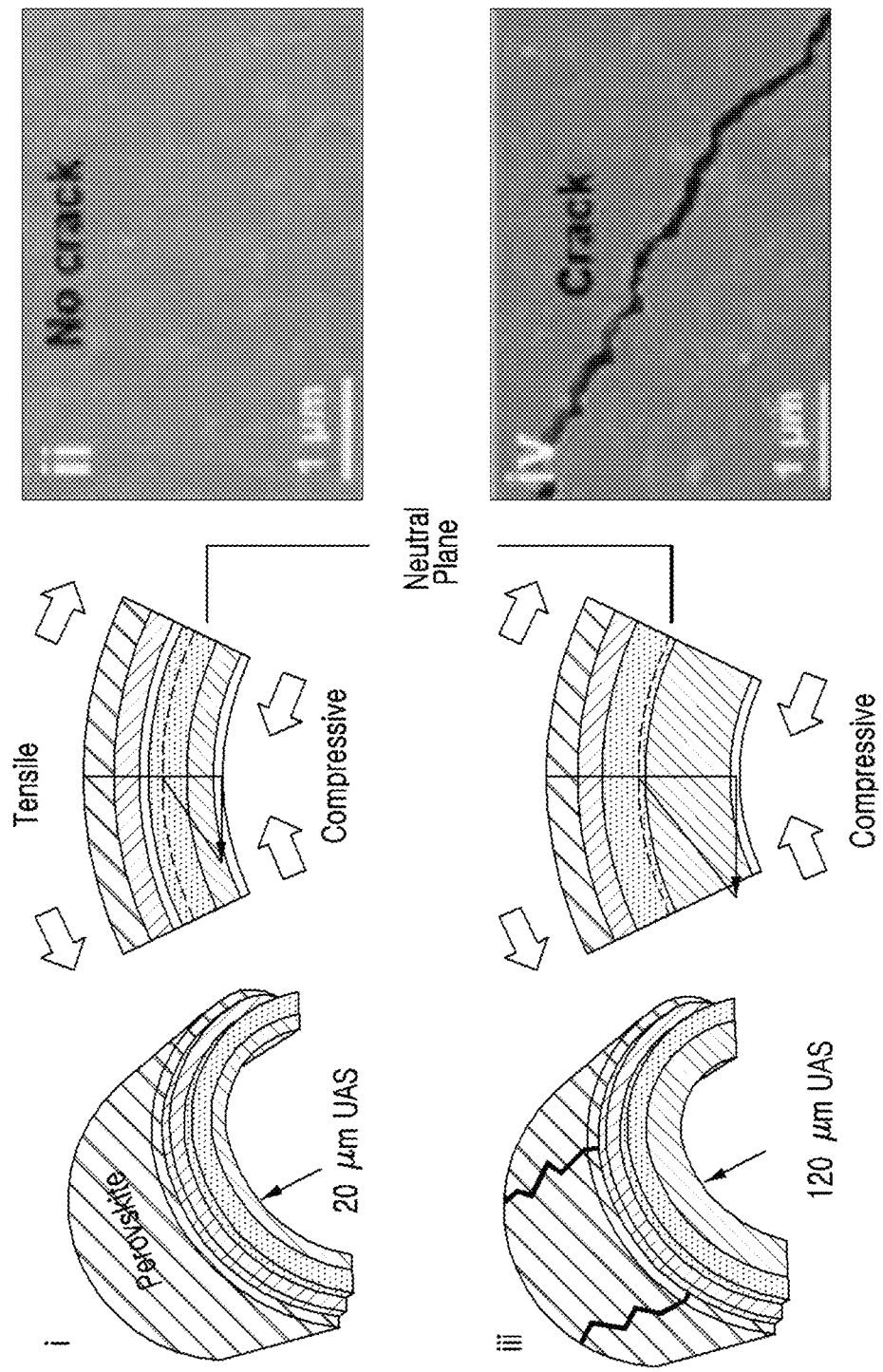

FIG. 17 is a diagram illustrating stability test results of a flexible perovskite layer upon variation of the neutral plane depending on film thickness.

In general, since photon yield can be increased through attachment of a sticker type antireflection film, which requires increase in distance between the neutral plane and the perovskite layer, it is very important to minimize the thickness of the ultra-thin antireflection sticker.

Here, a 120 μm thick PFPE film has similar flexural rigidity to a PDMS film having a thickness of 200 μm and the ultra-thin antireflection sticker according to the present invention can be fabricated to a thin thickness of 20 μm unlike an existing antireflection film having a thickness of 120 μm or more due to process constraints.

As shown in FIG. 17, although the ultra-thin antireflection sticker according to the present invention is formed of perfluorinated polyether (PFPE), it can be confirmed that the distance between the perovskite layer and the mechanical neutral plane is decreased to 480 nm when a 20 μm thick ultra-thin antireflection sticker according to the present invention is applied to the perovskite layer instead of a 120 μm thick equivalent material generating less stress.

Figure 18:
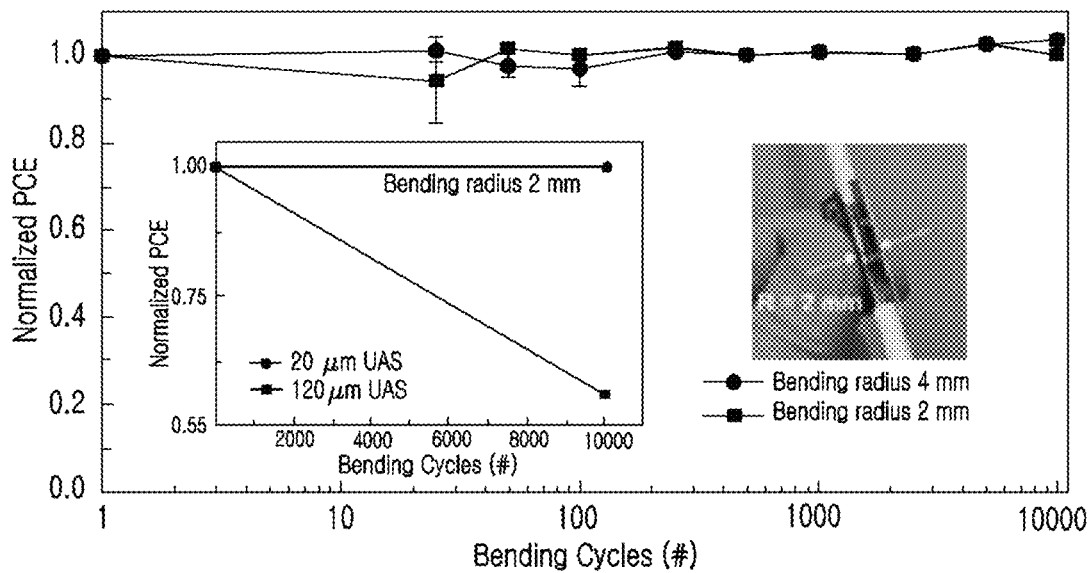

FIG. 18 is a graph depicting bending test results depending on the thickness of an antireflection film (ultra-thin antireflection sticker) at bending radii of 2 mm and 4 mm.

Referring to FIG. 18, it could be seen that, upon bending testing, an ITO electrode was replaced by a conductive polymer (PH1000) having higher mechanical durability to allow better visualization of an effect of stress on perovskite and the flexible perovskite solar cell adopting the ultra-thin antireflection sticker according to the present invention maintained initial efficiency even after 10,000 times of bending tests at a bending radius of 2 mm.

Conversely, it could be seen that the flexible perovskite solar cell adopting a 120 μm thick ultra-thin antireflection sticker exhibited reduction in efficiency to 52% of initial efficiency under the same conditions.

Actually, it could be seen that the flexible perovskite solar cell adopting the ultra-thin antireflection sticker according to the present invention exhibited substantially no change in shape after 10,000 times of bending tests at a bending radius of 2 mm, whereas the flexible perovskite solar cell adopting the 120 μm thick ultra-thin antireflection sticker suffered from generation of cracks (see FIG. 17).

Consequently, the ultra-thin antireflection sticker according to the present invention formed to a thin thickness of 20 μm can improve efficiency of the flexible perovskite solar cell while minimizing negative influence inevitably generated on mechanical durability in use of an existing antireflection sticker.

FIG. 19 is a graph depicting stability test results of the ultra-thin antireflection sticker under an extreme external environment and FIG. 20 is a graph depicting optical stability test results of a film applied to a perovskite solar cell after humid heat test at 85° C./85% RH for 1,000 hours.

Referring to FIG. 19 and FIG. 20, after stability testing under various environments in which the ultra-thin antireflection sticker according to the present invention was placed in air, in water, in strong light (2250 lm), at high temperature (85° C.) or under 85° C./85% RH conditions (85/85 humid heat testing) for 168 hours, it could be seen that the ultra-thin antireflection sticker according to the present invention maintained optical durability in terms of transmittance and reflectance, as compared to those of the ultra-thin antireflection sticker according to the present invention immediately after manufacture thereof.

In addition, for application to solar cells, it is necessary for an antireflection film to pass the humid heat test under conditions of 85° C./85% as shown in FIG. 20, and it could be seen that the ultra-thin antireflection sticker according to the present invention after being exposed to the test conditions for 1,000 hours exhibited similar performance to the ultra-thin antireflection sticker according to the present invention immediately after manufacture thereof.

Consequently, the ultra-thin antireflection sticker according to the present invention can maintain high efficiency of the perovskite solar cell even under extreme external environments for a long period of time.

FIG. 21 is a view illustrating long-term stability of the ultra-thin antireflection sticker manufactured by the ultra-thin antireflection sticker manufacturing method according to the present invention. It could be seen that the ultra-thin antireflection sticker according to the present invention immediately after manufacture thereof and the ultra-thin antireflection sticker according to the present invention 6 months after manufacture thereof maintained similar levels of transmittance and reflectance.

Although some embodiments have been described herein with reference to the accompanying drawings, it should be understood that these embodiments are provided for illustration only and are not to be construed in any way as limiting the present invention, and that various modifications, changes, alterations, and equivalent embodiments can be made by those skilled in the art without departing from the spirit and scope of the invention and are not to be understood in individual form from the technical ideas or views of the invention.

| <List of Reference Numerals> | |
| --- | --- |
| 100: Base | 200: Antireflection structure |
| 300: Antireflection groove | 1000: Master mold |
| 1100: Mold base | 1200: Mold structure |
| 2000: Sticker material | 2100: Completely cured layer |
| 2200: Incompletely cured layer | 3000: Cured film |

The invention claimed is:

1. A method of manufacturing an ultra-thin antireflection sticker, comprising:
    a master mold manufacturing step in which a master mold having a plurality of semi- spherical mold structures on an upper surface thereof is manufactured;
    a sticker material coating step in which a sticker material comprising a perfluorinated polyether (PEPE) is coated onto the upper surface of the master mold;
    a cured film covering step in which a cured film is disposed to cover an entire area of a upper surface of the sticker material;
    a curing step in which the sticker material is cured;
    a cured film removal step in which the cured film is removed from the sticker material; and
    a sticker peeling step in which the cured sticker material is peeled off the master mold, the peeled-off sticker material forming a monolayer-structured ultra-thin antireflection sticker comprising a flat base and a plurality of antireflection structures protruding from an upper surface of the flat base to form semi-spherical groove shapes,
    wherein the ultra-thin antireflection sticker has a total thickness of about 20 μm and the flat base and the antireflection structures are integrally formed of a same material.

2. The method of manufacturing an ultra-thin antireflection sticker according to claim 1, wherein, the ultra-thin antireflection sticker is free of any separate bonding layer or adhesive agent.

3. The method of manufacturing an ultra-thin antireflection sticker according to claim 1, wherein, in the cured film covering step, the cured film is formed of a polyethylene terephthalate (PET) material.

4. The method of manufacturing an ultra-thin antireflection sticker according to claim 1, wherein the cured film covering step comprises:
    a covering step in which the cured film is disposed to cover the entire area of the upper surface of the sticker material; and
    a thickness adjustment step in which the cured film presses the sticker material to adjust the thickness of the sticker material.

5. The method of manufacturing an ultra-thin antireflection sticker according to claim 1, wherein, in the sticker peeling step, each of the antireflection structures formed on the upper surface of the ultra-thin antireflection sticker forms a semi-spherical groove shape having a diameter of about 280 nm to 320 nm and a depth of about 180 nm to 220 nm.

\* \* \* \* \*